United States Patent
Patel et al.

(10) Patent No.: US 8,930,829 B2
(45) Date of Patent: Jan. 6, 2015

(54) PRESENCE CHANGE ALERT

(75) Inventors: AshvinKumar Patel, Patan (IN); Glen Okita, Los Altos, CA (US); Meigy Tsai, San Jose, CA (US); Michael Tovino, Bend, OR (US)

(73) Assignee: Shoretel, Inc., Sunnyvale, CA (US)

( * ) Notice: Subject to any disclaimer, the term of this patent is extended or adjusted under 35 U.S.C. 154(b) by 1041 days.

(21) Appl. No.: 12/241,552

(22) Filed: Sep. 30, 2008

(65) Prior Publication Data

US 2010/0083142 A1  Apr. 1, 2010

(51) Int. Cl.
*G06F 15/16* (2006.01)
*G06F 3/048* (2013.01)
*G06Q 10/10* (2012.01)

(52) U.S. Cl.
CPC ................................ *G06Q 10/107* (2013.01)
USPC .......................... 715/758; 715/736; 715/741

(58) Field of Classification Search
CPC ...... G06F 1/1626; G06F 21/1316; G06F 8/65
USPC .......................................... 715/758, 736, 741
See application file for complete search history.

(56) References Cited

U.S. PATENT DOCUMENTS

| | | | |
|---|---|---|---|
| 7,383,308 B1 * | 6/2008 | Groves et al. | 709/206 |
| 8,064,355 B2 * | 11/2011 | Klassen et al. | 370/252 |
| 2001/0021649 A1 * | 9/2001 | Kinnunen et al. | 455/412 |
| 2002/0098831 A1 * | 7/2002 | Castell et al. | 455/413 |
| 2002/0140726 A1 * | 10/2002 | Schwartz et al. | 345/738 |
| 2002/0186257 A1 * | 12/2002 | Cadiz et al. | 345/838 |
| 2003/0046296 A1 * | 3/2003 | Doss et al. | 707/102 |
| 2003/0052915 A1 * | 3/2003 | Brown et al. | 345/752 |
| 2004/0172456 A1 * | 9/2004 | Green et al. | 709/207 |
| 2005/0041793 A1 * | 2/2005 | Fulton et al. | 379/211.01 |
| 2005/0097473 A1 * | 5/2005 | Malik et al. | 715/739 |
| 2005/0108348 A1 * | 5/2005 | Lee | 709/207 |
| 2005/0261011 A1 * | 11/2005 | Scott | 455/466 |
| 2006/0053380 A1 | 3/2006 | Spataro et al. | |
| 2006/0149816 A1 * | 7/2006 | Cadiz et al. | 709/206 |
| 2006/0210034 A1 * | 9/2006 | Beadle et al. | 379/88.22 |
| 2007/0010275 A1 | 1/2007 | Kiss | |
| 2007/0071209 A1 | 3/2007 | Horvitz et al. | |
| 2007/0233875 A1 * | 10/2007 | Raghav et al. | 709/227 |
| 2007/0264989 A1 * | 11/2007 | Palakkal et al. | 455/416 |

(Continued)

OTHER PUBLICATIONS

International Search Report, PCT/US09/56387, Nov. 2, 2009, 11 pages.

(Continued)

*Primary Examiner* — Daeho Song
(74) *Attorney, Agent, or Firm* — Patent Law Works LLP

(57) ABSTRACT

An apparatus and a method for monitoring availability of a contact are described. The apparatus includes an interface module for receiving a selection from a user that indicates the contact to be monitored. The apparatus also includes a presence change alert manager that is coupled to the interface module and is coupled to a network. The presence changer alert manager is configured to determine at least one relevant type of availability for the contact and to determine if availability information obtained from the network corresponds to a change in a relevant type of availability for the contact. The apparatus further includes a notification manager coupled to the presence change alert manager. If the presence change alert manager determines that the obtained availability information corresponds to a change of a relevant type of availability for the contact, the notification manager generates a notification alerting the user of the change.

36 Claims, 11 Drawing Sheets

(56) References Cited

U.S. PATENT DOCUMENTS

| | | |
|---|---|---|
| 2008/0013705 A1* | 1/2008 | Yoffie et al. .............. 379/201.12 |
| 2008/0069331 A1 | 3/2008 | Levy et al. |
| 2008/0148154 A1* | 6/2008 | Burrell et al. ................. 715/733 |
| 2008/0201419 A1* | 8/2008 | Hung et al. ................... 709/204 |
| 2008/0234006 A1* | 9/2008 | Lee et al. ...................... 455/566 |
| 2008/0240384 A1* | 10/2008 | Suryanarayana et al. . 379/88.21 |
| 2008/0256107 A1* | 10/2008 | Banga et al. .................. 707/102 |
| 2009/0100378 A1* | 4/2009 | Klassen et al. ................ 715/821 |
| 2009/0147772 A1* | 6/2009 | Rao et al. ...................... 370/352 |

OTHER PUBLICATIONS

International Search Report, PCT/US2009/056387, Apr. 14, 2011, 8 pages.

\* cited by examiner

US 8,930,829 B2

PRESENCE CHANGE ALERT

BACKGROUND OF THE INVENTION

1. Field of the Invention

The present invention relates to network communications. In particular, the present invention relates to a system and method for issuing notifications of a change in availability of a network contact.

2. Description of the Background Art

Many communication applications, such as telephony, email and instant messaging applications, allow a user to create and store data entries that include contact information for individuals, groups of individuals, or organizations. These data entries, like the entities they represent, are commonly referred to as "contacts." Contacts typically include telephone numbers, email addresses, instant messaging aliases and other contact information. In addition to managing contacts for a user, many conventional communication applications also provide a status indicator for a contact. Typically, the status indicator conveys that the contact either is or is not presently available for communication.

However, the status indicators of conventional communication applications are limited to providing only present availability information. For example, when a contact is unavailable, a conventional status indicator provides no information regarding when the contact will become available, forcing the user to actively monitor the communication application for changes in the status indicator. Moreover, conventional communication applications and their status indicators are concerned with only a single type of availability. For example, conventional instant messaging applications provide status indicators that convey only present instant messaging availability.

Thus, there is a need for providing a user with improved availability information for a contact. Particularly, there is a need for providing the user with improved notification of a change in availability of the contact.

SUMMARY OF THE INVENTION

A method is disclosed for monitoring availability of a contact. In one embodiment, a selection is received from a user that indicates the contact to be monitored. At least one relevant type of availability is determined. Availability information is obtained from a network. If it is determined that the obtained availability information corresponds to a change in a relevant type of availability, a notification alerting the user of the change is displayed. The notification accepts user input, allowing the user to initiate communication with the contact or select a snooze option.

An apparatus is also disclosed for monitoring availability of a contact. In one embodiment, the apparatus includes an interface module for receiving a selection from a user that indicates the contact to be monitored. The apparatus also includes a presence change alert manager that is coupled to the interface module and is coupled to a network. The presence change alert manager is configured to determine at least one relevant type of availability for the contact. The presence change alert manager also determines if availability information obtained from the network corresponds to a change in a relevant type of availability for the contact. The apparatus further includes a notification manager coupled to the presence change alert manager. In response to the presence change alert manager determining that the obtained availability information does correspond to a change of a relevant type of availability for the contact, the notification manager generates a notification alerting the user of the change. The notification may include various options for the alert, responding to the alert, and dismissing the alert for a predetermined amount of time.

BRIEF DESCRIPTION OF THE DRAWINGS

The present invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
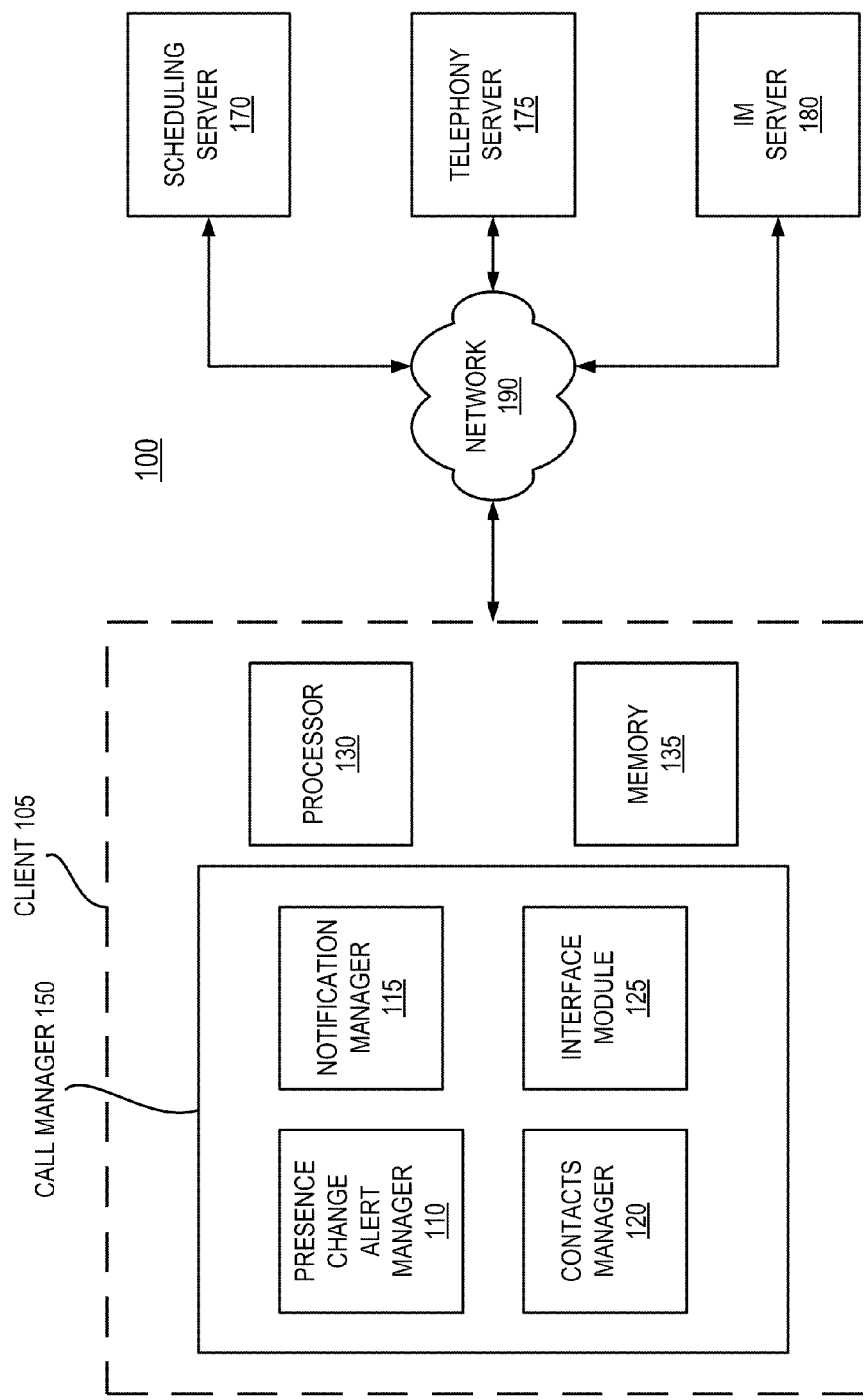
FIG. 1A is a block diagram of a presence change alert system in accordance with a first embodiment of the present invention.

Systems and methods for notifying a user of a change in availability for a contact are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any peripheral devices providing services. Furthermore, the system and method are described in the context of an IP telephony system, but may also be used and implemented in a conventional telephony system.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB drive with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

The system of the present invention includes a communication application that provides presence change alert for a user's contacts. As used herein, presence change alert refers to monitoring a contact's availability for communication (referred to simply as availability hereinafter) and providing the user with a notification of a change in the contact's availability. The user interacts with the communication application to select one or more contacts for presence change alert. Hereinafter, a contact that has been selected for presence change alert is referred to as a desired contact. The communication application monitors a network for availability information to determine when the desired contact's availability changes. In one embodiment, the communication application of the present invention monitors the network by receiving messages from other network entities that include availability information.

Also, the communication application supports multiple conventional communication protocols such as Voice over Internet Protocol (VoIP) telephony and conventional instant messaging protocols. Accordingly, the communication application can monitor availability over multiple communication protocols and distinguish between different types of availability corresponding to the protocols (e.g., telephonic versus instant messaging availability). In one embodiment, the communication application determines a type of availability to monitor based on default settings configured by the user prior to selecting the desired contact. In another embodiment, the user specifies one or more types of availability for monitoring as part of selecting the desired contact. In still another embodiment, the communication application determines which types of availability to monitor based on availability information for the desired contact at the time of the user selection. In response to observing a change in availability for the desired contact, the system presents a notification including a time for the change, thereby relieving the user from having to actively monitor the communication application. In one embodiment, the notification is persistent, remaining visible until it receives a user input.

Figure (FIG.) 1A illustrates a block diagram of a communication system 100 according to one embodiment of the present invention. The illustrated embodiment of the communication system 100 includes a client 105, a scheduling server 170, a telephony server 175 and an instant message (IM) server 180. The client 105, scheduling server 170, telephony server 175 and IM server 180 are communicatively coupled via a network 190.

In one embodiment of the present invention, the network 190 is a partially public or a wholly public network such as the Internet. The network 190 is preferably a wide area network. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the present invention, the network 190 is an IP-based wide or metropolitan area network.

The client 105 enables the user to communicate with contacts using various network communication devices (e.g., telephones and computers) coupled to the network 190. In one embodiment, the client 105 is a conventional general purpose computer executing a communication application. A number of supplementary devices (not shown) can be coupled to or included in the client 105. For example, the client 105 can include a keyboard and mouse as well as a conventional display device. Possible supplementary devices also include analog phones and Voice over Internet Protocol (VoIP) phones communicatively coupled to the client 105. In another embodiment, the client 105 is a telephony-specific device such as a VoIP phone and includes conventional input and output devices (not shown) such as keypads, touch screens and liquid crystal displays. In still another embodiment, the client 105 is a telephony-specific device that is communicatively coupled to a conventional general purpose computer and is thereby able to receive input from a keyboard and mouse associated with the computer as well as output data for presentation on a display device associated with the computer. In some embodiments, the client 105 is communicatively coupled to and displays information on multiple display devices, eliminating the need for a user to monitor a single screen. For example, in one embodiment the client 105 is a general purpose computer and displays a first interface on an associated conventional display and displays a second interface on a liquid crystal display included in a communicatively coupled VoIP phone. Other embodiments of the client 105 include a single interface on a single display.

The client 105 includes a processor 130. The processor 130 can be a conventional processing device, such as a general-purpose microprocessor. The client 105 also includes a memory 135. In one embodiment, the memory 135 is a computer-readable storage medium and includes executable program instructions or functional units that implement features of the present invention. The processor 130 executes executable program instructions included in the memory 135. In the illustrated embodiment, the client 105 additionally includes a call manager 150. The call manager 150, described below in further detail, is a communication application that provides presence change alert based on availability information provided by the scheduling server 170, telephony server 175 and IM server 180. In some embodiments, the call manager 150 is included in the memory 135.

In one embodiment the scheduling server 170, telephony server 175 and IM server 180 are conventional network servers. In other embodiments, the scheduling server 170, telephony server 175 and IM server 180 are other conventional network devices. In yet another embodiment, the scheduling server 170, telephony server 175 and IM server 180 are embedded network devices or appliances. The servers 170, 175, 180 each include a processor and a memory. Although not shown, the scheduling server 170, telephony server 175 and IM server 180 are coupled to numerous network communication devices via the network 190. For example, in one embodiment the telephony server 175 is associated with a network communication service that enables telephonic communication between multiple communication devices coupled to the network 190. The telephony server 175 outputs signals via the network 190 to provide information related to the telephonic availability of one or more contacts. For example, the telephony server 175 can indicate that a contact is on an active call. The telephony server can also indicate call forwarding settings (e.g., allow call forwarding or do not disturb) or a specific call handling mode for the contact. Similarly, in one embodiment the IM server 180 is associated with a network communication service that enables IM transmissions between network communication devices and outputs signals via the network 190 to provide information related to the IM availability of one or more contacts.

In one embodiment, the scheduling server 170 is associated with a scheduling application included in one or more network communication devices. For example, in modern office environments, it is typical for an employee to maintain a schedule of his appointments and obligations using a scheduling application. The scheduling application typically includes network functionalities to make the employee's schedules available to individuals with an appropriate level of access, thereby facilitating convenient scheduling of collaborative tasks within the office environment. Hence, in one embodiment, the scheduling server 170 can utilize its association with a conventional scheduling application to provide information related to the scheduling availability of one or more contacts associated with the network 190. For example, if the scheduling application indicates that a contact is currently in a meeting, the scheduling server 170 can provide information that the contact is currently unavailable.

In other embodiments, the call manager 150 can obtain availability information from other sources. Furthermore, availability information can be based a variety of factors. For example, availability information can be provided by a geo-location server (not shown) and based on a physical location of a contact. The physical location can be determined using conventional GPS or IP address locating techniques. Alternatively, the physical location of a wireless communication device, such as a cellular phone, can be determined based on the location of an antenna in communication with the device. As an additional example, availability information can be provided by an office presence server (not shown) and based on a contact being in her office. For example, a proximity sensor can determine if the contact is near or far from an associated communication device located in her office. Availability information for a contact can also be based on whether or not an associated communication device is powered on or off. For example, a device status server (not shown) associated with a cellular phone service can provide information regarding whether a particular cellular phone is presently on or off. Additionally, many telephony and other communication service providers offer a variety of last-call return features, such as "camp on," features of which can also be exploited to obtain availability information.

A user of the client 105 selects a desired contact for presence change alert. The call manager 150 monitors the network 190 for availability information related to a relevant type of availability for the desired contact. As used herein, a relevant type of availability is a type of availability determined to be of interest to the user. Methods for determining one or more relevant types of availability for the desired contact are detailed below. Based on availability information, the call manager 150 notifies the user when a change in a relevant type of availability for the desired contact occurs. FIG. 1A includes a high-level block diagram illustrating a detailed view of the call manager 150 according to one embodiment. As shown in FIG. 1A, the call manager 150 includes several modules. Other embodiments of the call manager 150 can have different and/or other modules than the ones described here. Also, the functionalities of the call manager 150 can be distributed among the modules in a different manner.

The call manager 150 includes a contacts manager 120 which allows a user to create and store contacts. Contacts stored by the contacts manager 120 can include one or more names, telephone numbers, email addresses, physical addresses, IM aliases or other contact information for one or more individuals or organizations. The contacts manager 120 also supports a number of conventional data storage structures, such as look-up tables, enabling the user to organize and manage the contacts as desired.

The call manager 150 also includes an interface module 125. The interface module 125 handles tasks related to user interaction with the call manager 150. For example, the interface module 125 receives input from the user via a conventional input device communicatively coupled to or included in the client 105. The interface module 125 presents an interface to the user via a conventional display device communicatively coupled to or included in the client 105. In one embodiment, the interface is a complete graphical user interface (GUI) including interactive features such as dialog boxes, drop-down menus, pop-up menus, data submission fields, selectable icons or checkboxes to receive user input. Through the GUI, the interface module 125 accepts user commands related to network communication tasks such as managing a contact, calling a contact or initiating an IM session with a contact. In one embodiment, the GUI also allows the user to configure default settings for relevant types of availability for a contact. In particular, the GUI allows the user to select a contact for presence change alert. The interfaces provided by the interface module 125 support user interactions and selection processes typical of conventional GUI's. In one embodiment, the interface module 125 presents a first GUI on a first display device coupled to the client 105 and a second GUI on a second display device coupled to the client 105. Various embodiments of the user interface are described in more detail below and are illustrated in FIGS. 4-8.

Additionally, the call manager 150 includes a presence change alert manager 110. The presence change alert manger 110 monitors the network for information related to the availability of one or more desired contacts over multiple communication protocols. A user can select multiple desired contacts, in which case the presence change alert manager 110 provides presence change alert for the multiple contacts simultaneously. In one embodiment, the presence change alert manager 110 directs the interface module 125 to display an interactive list of contacts for which presence change alert has been requested. The interactive list allows the user to cancel one or more outstanding presence change alert requests.

The presence change alert manager 110 determines one or more relevant types of availability (e.g., telephonic availability, IM availability or scheduling availability) for each desired contact. In one embodiment, when the user selects a contact for presence change alert, the presence change alert manager 110 requests availability information for the desired contact over the network 190. Specifically, the presence changer alert manager 110 determines one or more types of communication for which the desired contact is unavailable at the time of the user selection. The presence change alert manager 110 then determines that those types of communication correspond to relevant types of availability.

In another embodiment, the presence change alert manager 110 stores and analyzes default settings indicating relevant types of availability for a contact. For example, default settings can indicate that only telephonic and IM availability can represent relevant types of availability for a first contact while telephonic, IM, and scheduling availability can all represent relevant types of availability for a second contact. In yet another embodiment, the presence change alert manager 110 determines one or more relevant types of availability by analyzing a selection process employed by the user for a particular selection of a desired contact. As is described below in more detail in reference to FIG. 2, a variety of selection processes are available to the user. If, for example, the user employs a selection process that includes attempting to call the desired contact, the presence change alert manager 110 can determine that telephonic availability is a relevant type of availability. In still another embodiment, the user specifies one or more relevant types of availability as part of the selection process.

In some embodiments, as described above, the scheduling server 170, telephony server 175 and IM server 180 are configured to output availability signals over the network 190 responsive to a change in availability of an associated contact. In such embodiments, the presence change alert manager 110 receives an availability signal and determines if it corresponds to a relevant type of availability for the desired contact by checking a stored list of desired contacts and associated relevant types of availability. In other embodiments, the presence change alert manager 110 periodically polls the scheduling server 170, telephony server 175 or IM server 180 to request availability information related to one or more desired contacts. In some embodiments, the presence change alert manager 110 employs a combination of the above-described techniques to obtain availability information, depending upon the respective configurations and capabilities of the scheduling server 170, telephony server 175 and IM server 180.

Figure 9:
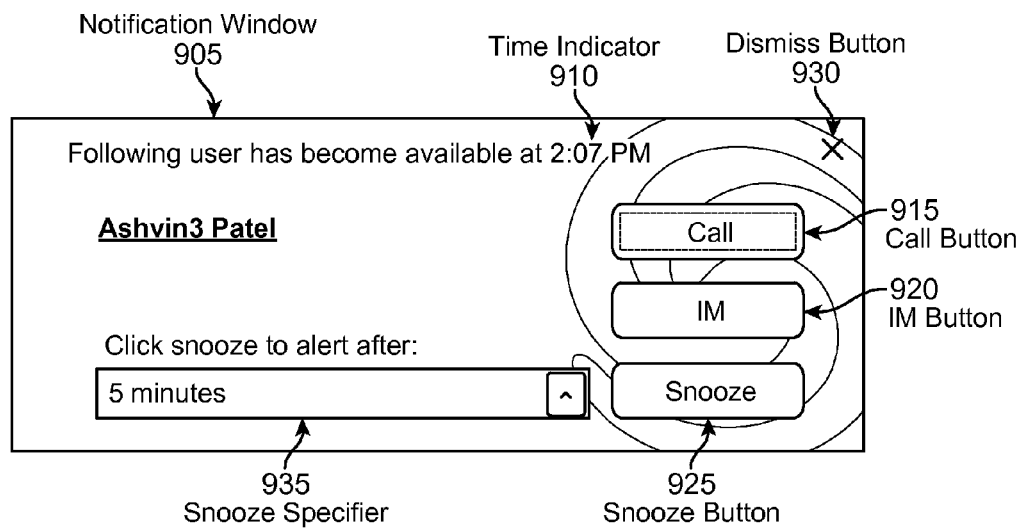
FIG. 9 is a graphical representation of one embodiment of a notification of a change in contact availability in accordance with the present invention.

The call manager 150 also includes a notification manager 115. When the presence change alert manager 110 discovers a change in a relevant type of availability for a desired contact, it communicates the change to the notification manager 115. In response to receiving the change, the notification manager 115 presents a notification to the user via a display communicatively coupled to or included in the client 105. In one embodiment, the notification comprises a notification window 905 as illustrated in FIG. 9. The notification manager 115 controls the on-screen appearance and placement of the notification window 905. In one embodiment, the notification window 905 is a persistent notification that remains visible on the display until a user action. In situations involving multiple desired contacts, it is possible that multiple notifications may be issued by the notification manager 115 before any user action occurs. In such situations, the notification manager 115 can display multiple notification boxes 905 in either an overlapped or side-by-side on-screen arrangement. In one embodiment, as detailed below in reference to FIG. 9, the notification window 905 includes an interactive interface with various selectable buttons or interactive menus. The notification manager 115 receives user input provided to the notification window 905 and communicates it to the presence change alert manager 110. The presence change alert manager 110 registers the user input and adjusts its operation accordingly. For example, as detailed below in reference to FIGS. 3 and 9, the presence change alert manager can call the desired contact or execute a snooze procedure in response to user input.

Figure 1B:
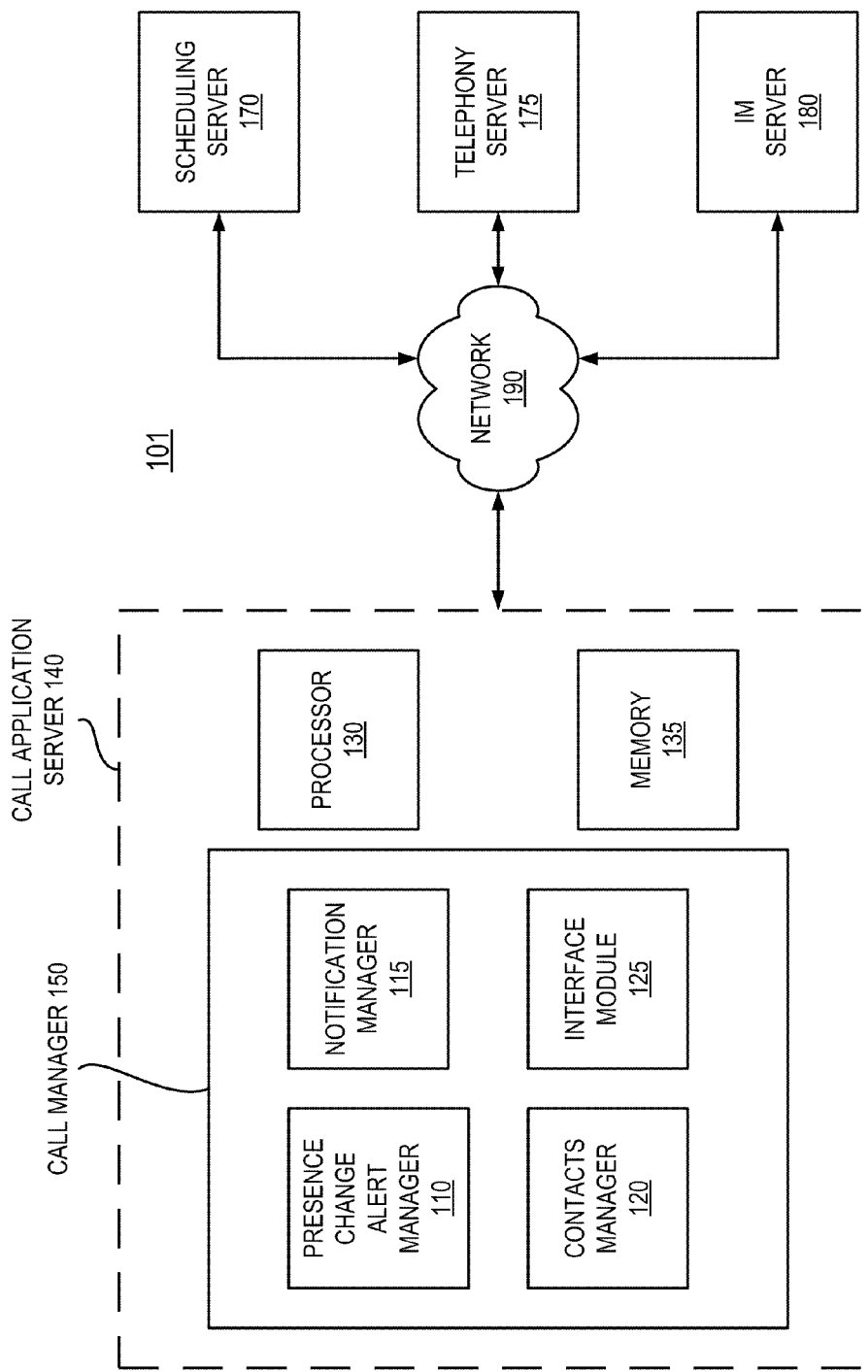
FIG. 1B is a block diagram of a presence change alert system in accordance with a second embodiment of the present invention.

Architectures different from the communication system 100 depicted in FIG. 1A are possible. For example, in some embodiments, the call manager 150 is included in the scheduling server 170, telephony server 175, and/or IM server 180. In other embodiment, the call manager is included in a separate server. Referring now to FIG. 1B, a server-based communication system 101 is illustrated in which the call manager 150, processor 130, and memory 135 described above are included in a call application server 140. The call application server 140 is communicatively coupled to one or more associated network communication devices (not shown). In such embodiments, the call application server 140 receives input and outputs information via conventional input and display devices included in the associated network communication devices. In one embodiment, the call application server 140 provides an interface via a web browser or desktop application included in a conventional general purpose computer. The call application server 140 is also communicatively coupled to the scheduling server 170, the telephony server 175 and the instant message (IM) server 180 via the network 190. The call application server 140 provides presence change alert for one or more users via the techniques described in reference to FIG. 1A.

Figure 1C:
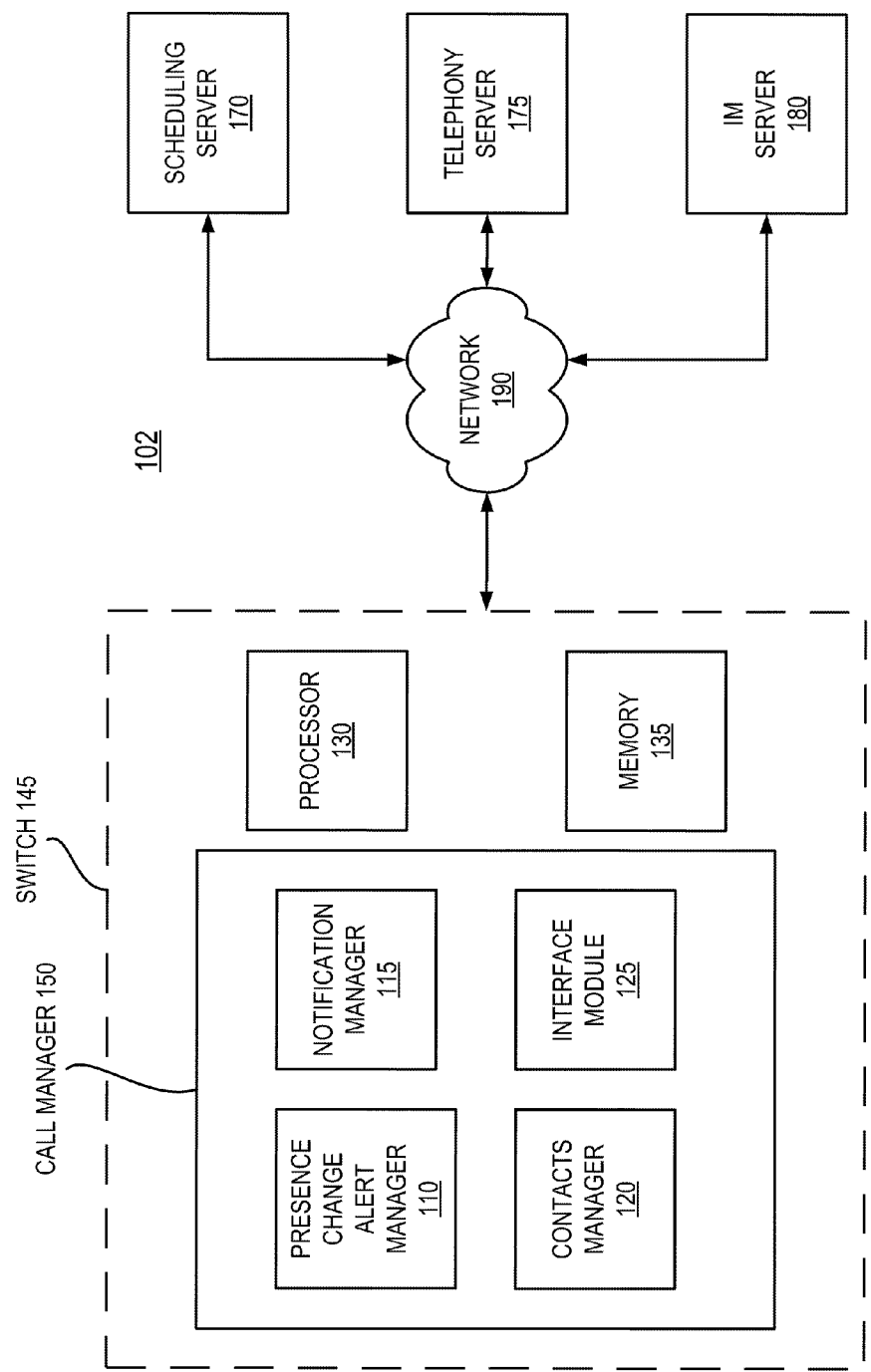
FIG. 1C is a block diagram of a presence change alert system in accordance with a third embodiment of the present invention.

Referring now to FIG. 1C, a switch-based communication system 102 is illustrated in which the call manager 150, processor 130, and memory 135 described above are included in a network or telephony switch 145. The switch 145 is communicatively coupled to one or more associated network communication devices (not shown). In such embodiments, the switch 145 receives input and outputs information via conventional input and display devices included in the associated network communication devices. Accordingly, the switch 145 is also communicatively coupled to the scheduling server 170, the telephony server 175 and the instant message (IM) server 180 via the network 190. The switch 145 provides presence change alert for one or more users via the techniques described in reference to FIG. 1A. Additional variations in system architecture are possible.

System Operation

Figure 2:
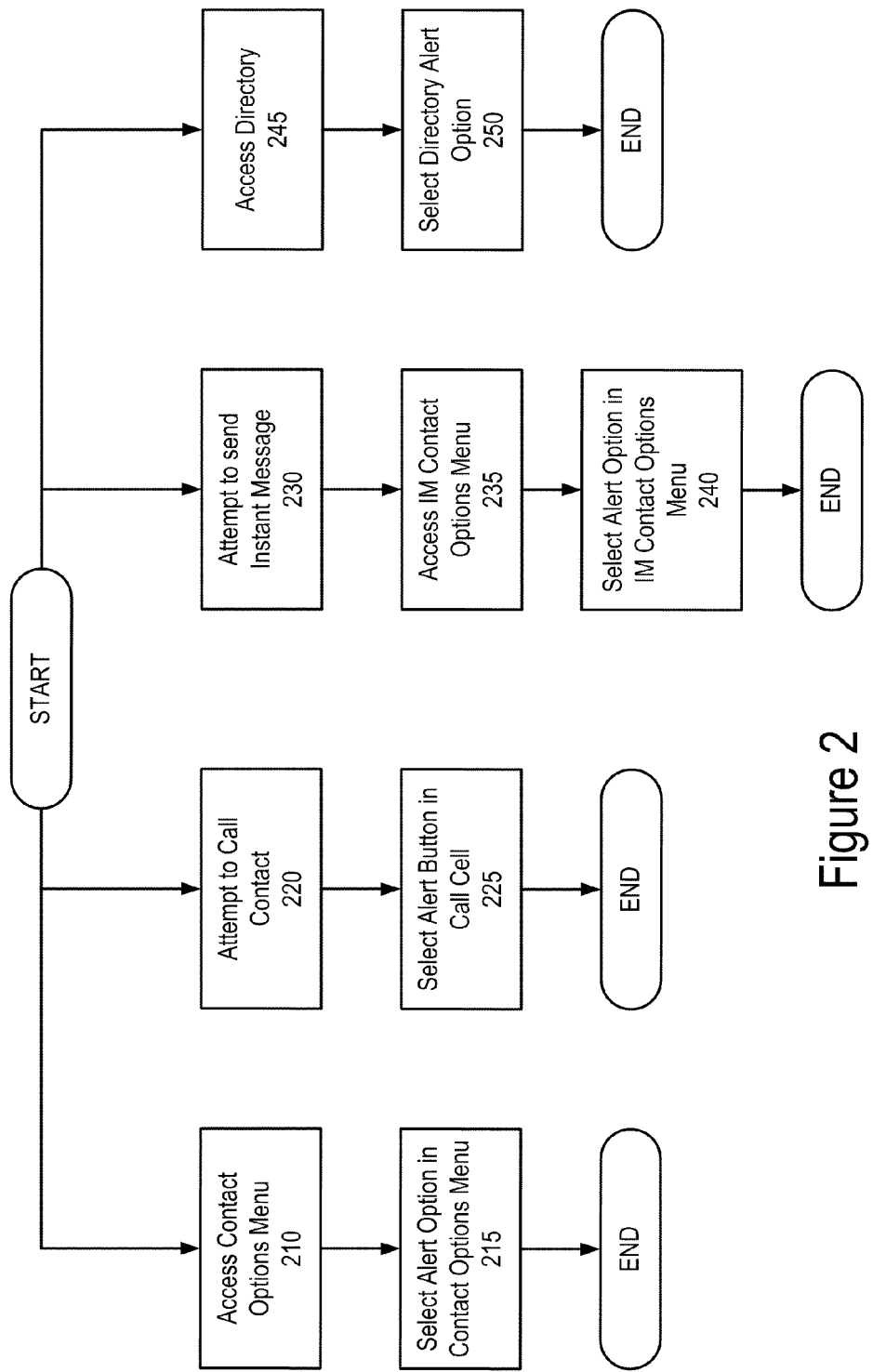
FIG. 2 is a flowchart of a method for using a presence change alert system in accordance with one embodiment of the present invention.

Although multiple system architectures are possible, system operation is described below in the context of the communication system 100 depicted in FIG. 1A for the sake of clarity. FIG. 2 is a flowchart of a method for using a presence change alert system in accordance with one embodiment of the present invention. In one embodiment, the user operates the presence change alert system by interacting with interfaces supplied by the interface module 125, such as those illustrated in FIGS. 4-7. Accordingly, for the sake of illustrative clarity, the following discussion of the method of FIG. 2 makes repeated reference to elements depicted in FIGS. 4-7. For example, in one embodiment the interface module 125 presents a call manager interface such as that depicted in FIG. 4. The interfaces provided by the interface module 125 support conventional GUI interactions. The call manager interface 405 has a contacts list 430 that includes contacts stored by the contacts manager 120. In one embodiment, the call manager interface 405 also includes a directory 435, details of which are provided below in reference to FIG. 7. The directory 435 provides the user with rapid access to stored contacts by recognizing text entered into the directory entry field 440 and presenting communication options for contacts having either names or contact information associated with the entered text. Referring now to FIG. 2, the user can employ several selection processes to activate presence change alert for a desired contact.

Figure 4:
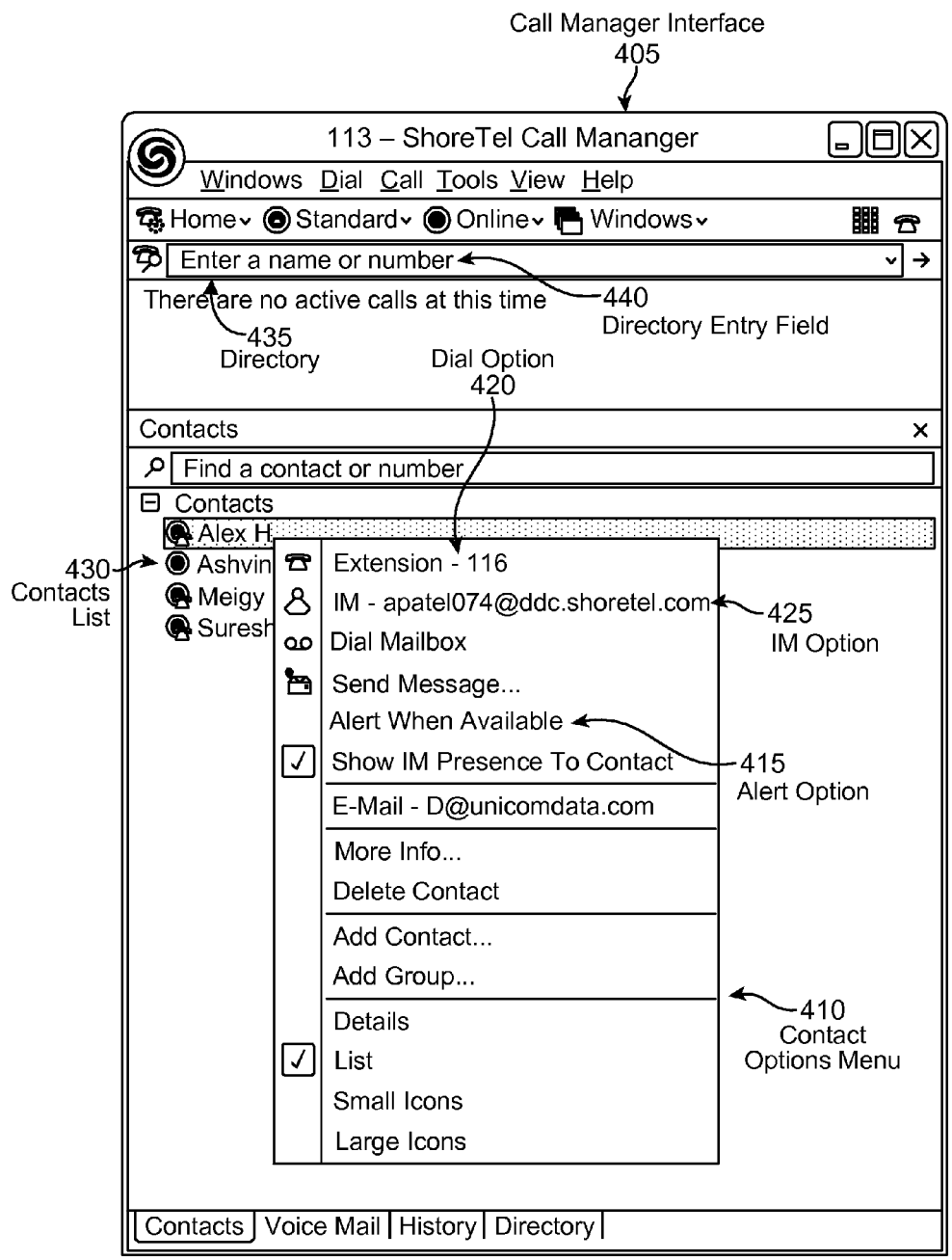
FIG. 4 is a graphical representation of one embodiment of a user interface showing a contact options menu in accordance with the present invention.

As a first example, the user can designate the desired contact for presence change alert by accessing 210 a contact options menu 410 associated with the desired contact. As illustrated in FIG. 4, the contact options menu 410 is an interactive widget presenting one or more selectable icons corresponding to various network communication tasks. In one embodiment, the user accesses 210 the contact options menu 410 by clicking on an icon associated with the desired contact with a mouse device communicatively coupled to the client 105. After accessing 210 the contact options menu 410, the user can designate the desired contact for presence change alert by selecting 215 an alert option 415 icon included in the contact options menu 410.

The above selection process can be particularly useful if, for example, the user already knows that the desired contact is currently unavailable, but would like to be alerted when the desired contact becomes available. In the embodiment depicted in FIG. 4, there is a single alert option 415 icon. As previously stated, in some embodiments the presence change alert manager 110 determines one or more relevant types of availability. In one embodiment, any type of communication for which the desired contact is unavailable at the time the single alert option 415 icon is selected 215 is treated as a relevant type of availability. The presence change alert manager 110 can also analyze user-configured default settings associated with the desired contact and determine one or more relevant types of availability accordingly. Alternatively, the contact options menu 410 can include multiple protocol-specific alert option icons (not shown), each corresponding to a particular type of availability. In such embodiments, the user directly specifies which types of availability are relevant for the desired contact for a particular instance of presence change alert.

Figure 5:
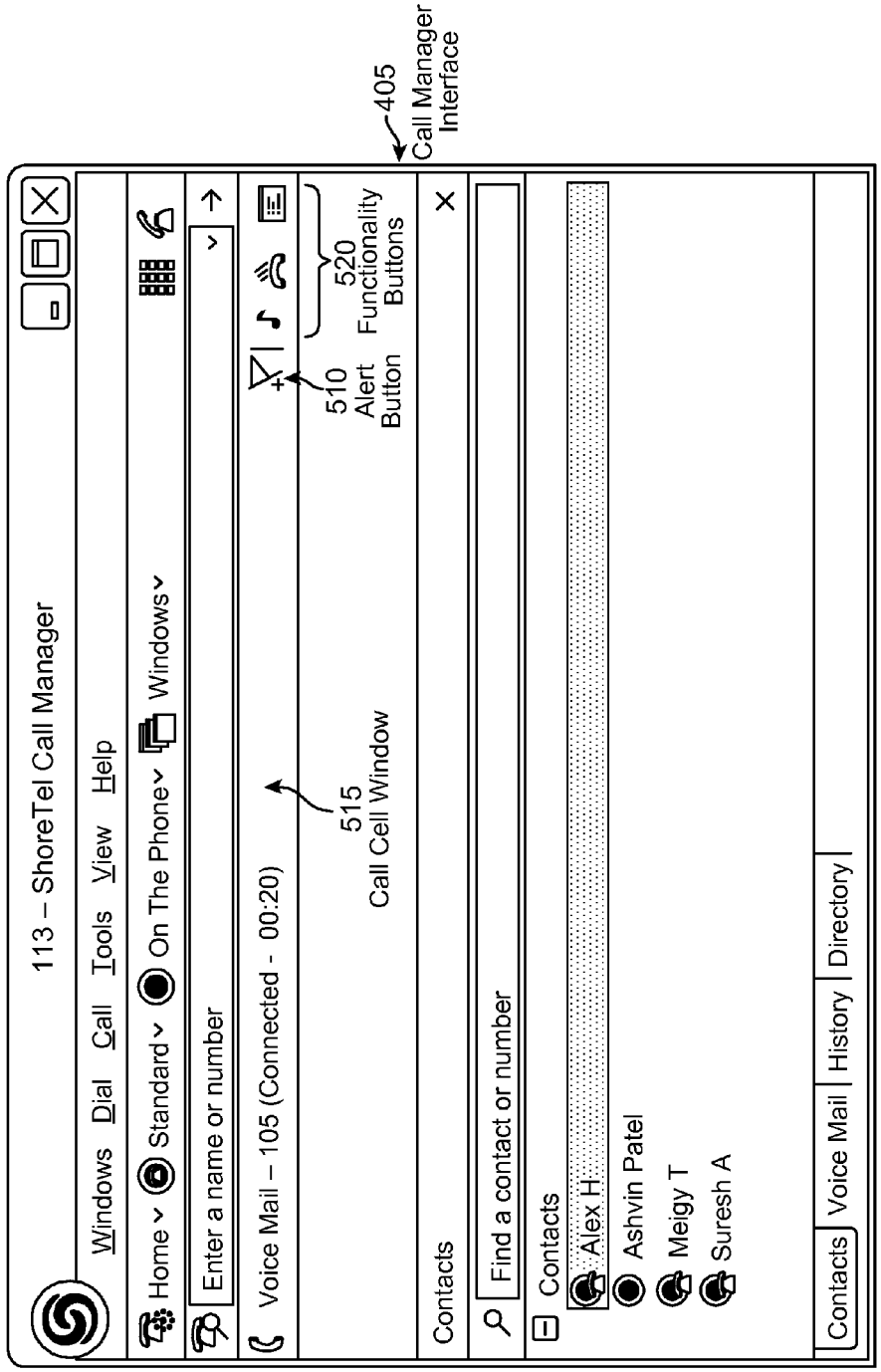
FIG. 5 is a graphical representation of one embodiment of a user interface showing a call cell window in accordance with the present invention.

As a second example, the user can attempt to call 220 the desired contact. For example, the user can select a dial option 420 icon presented by the contact options menu 410. Other methods for attempting to call 220 the desired contact are possible, such as dialing an associated number on a keypad included in the client 105 or using the directory 435. As depicted in FIG. 5, the call manager interface 405 presents a call cell window 515 corresponding to the call 220. If the desired contact is unavailable, the client 105 will present an unavailability indicator based on information provided by the telephony server 175. For example, the client 105 can output a busy signal, direct the call 220 to a voice mailbox or present a graphical unavailability indicator within the call manager interface 405. In response to the unavailability indicator, the user can designate the desired contact for presence change alert by selecting 225 an alert button 510 icon included in the call cell window 515. This method can be useful if, for example, the user did not know that the desired contact was unavailable prior to attempting the call 220. In one embodiment, in response to determining that the desired contact is available at the time of the attempted call 220, the call cell window 515 does not include the alert button 510 icon.

Again, in the embodiment depicted in FIG. 5, a single alert button 510 icon is presented and the presence change alert manager 110 determines one or more relevant types of availability. In one embodiment, any type of communication for which the desired contact is unavailable at the time the single alert button 510 icon is selected 225 is treated as a relevant type of availability. The presence change alert manager 110 can also analyze user-configured default settings. In one embodiment, the user can configure default settings permitting the presence change alert manager to analyze the selection process to determine one or more additional relevant types of availability beyond those indicated by other default settings. For example, based on the fact that the desired contact was designated for presence change alert by way of the call cell window 515, the presence change alert manager 110 can determine that telephonic availability is a relevant type of availability. In other embodiments, multiple protocol-specific alert button icons (not shown) are included in the call cell window 515, allowing the user to directly specify one or more relevant types of availability.

Inclusion of the alert button 510 icon and other functionality button 520 icons in the call cell window 515 conveniently allows the user to request network communications related to the call 220 in a single click manner, saving the user from having to navigate a series of pop-up or drop-down menus. Hence, though the user can return to the contact options menu 410 and select 215 the alert option 415 icon, such a multistep process is not necessary. Rather, the user can simply select 225 the alert button 510 icon conveniently included in the call cell window 515.

As a third example, the user can attempt to send 230 an IM to the desired contact. For example, the user can select an IM option 425 icon included in the contact options menu 410. In response to selection of the IM option 425 icon, the interface module 125 presents an IM interface 605 such as that depicted in FIG. 6. The IM interface 605 includes a selectable IM contacts list 620. The IM contacts list 620 includes IM status indicators 625, which are icons indicating the availability of an associated contact for IM activity. If the desired contact is unavailable, the associated IM status indicator 625 icon will reflect the desired contact's unavailability. In response, the user can designate the desired contact for presence change alert by selecting an icon associated with the desired contact from the IM contacts list 620 to access 235 an associated IM contact options menu 610. From the IM contact options menu 610, the user can select 240 an alert option 615 icon included in the IM contact options menu 610. This method can be useful if, for example, the user did not know that the desired contact was unavailable prior to attempting to send 230 the IM to the desired contact.

Figure 6:
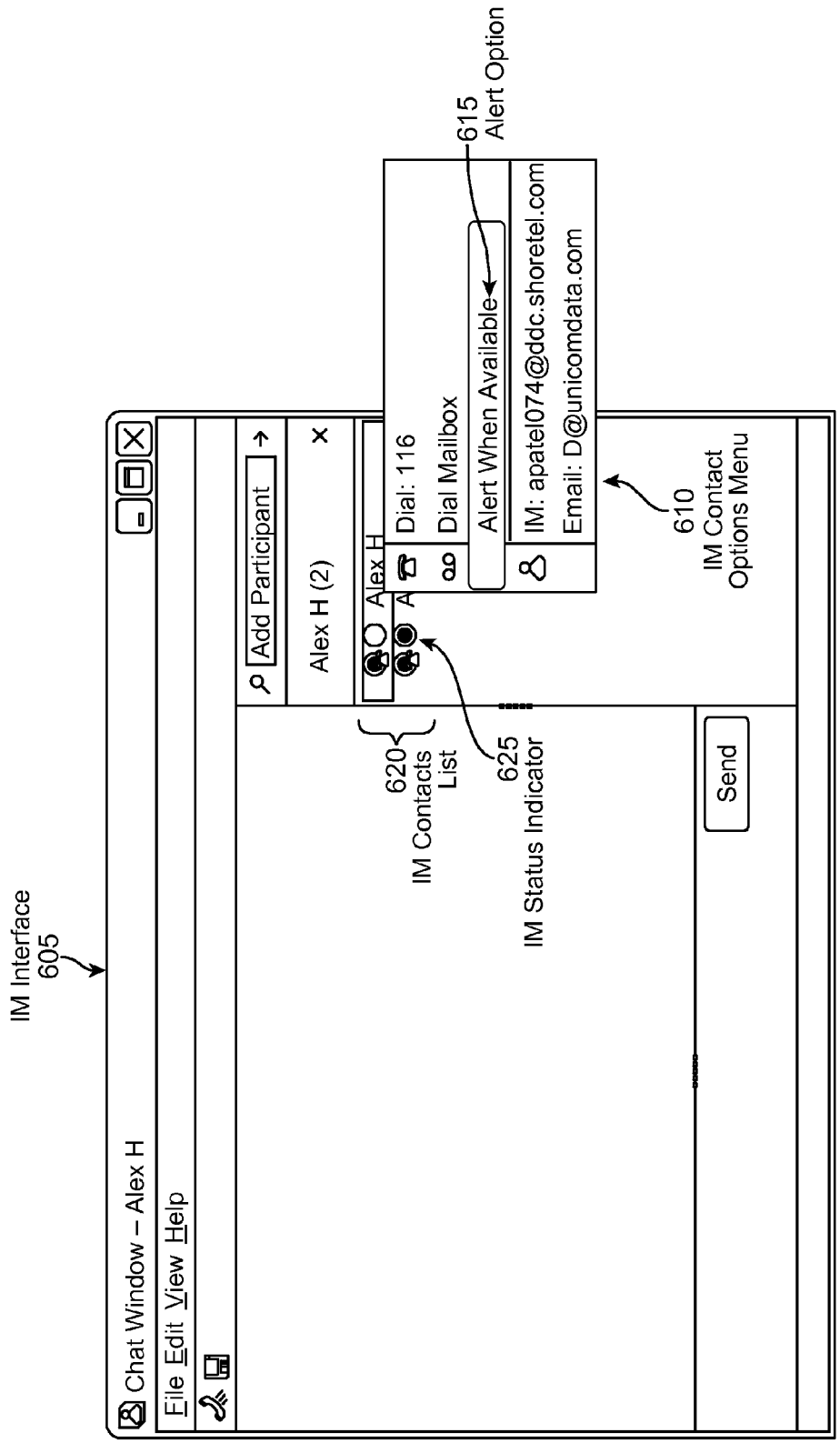
FIG. 6 is a graphical representation of one embodiment of a user interface showing an instant messaging contact options menu in accordance with the present invention.

Again, in the embodiment depicted in FIG. 6, a single alert option 615 icon is presented and the presence change alert manager 110 determines one or more relevant types of availability. In one embodiment, any type of communication for which the desired contact is unavailable at the time the single alert option 615 icon is selected 240 is treated as a relevant type of availability. The presence change alert manager 110 can also analyze user-configured default settings as part of determining one or more relevant types of availability. Again, in one embodiment, the user can configure default settings permitting the presence change alert manager to analyze the selection process to determine one or more additional relevant types of availability beyond those indicated by other default settings. For example, based on the fact that the desired contact was designated for presence change alert by way of the IM interface 605, the presence change alert manager 110 can determine that IM availability is a relevant type of availability. In other embodiments, multiple protocol-specific alert option icons are included in the IM contact options menu 610, allowing the user to directly specify one or more relevant types of availability.

Figure 7:
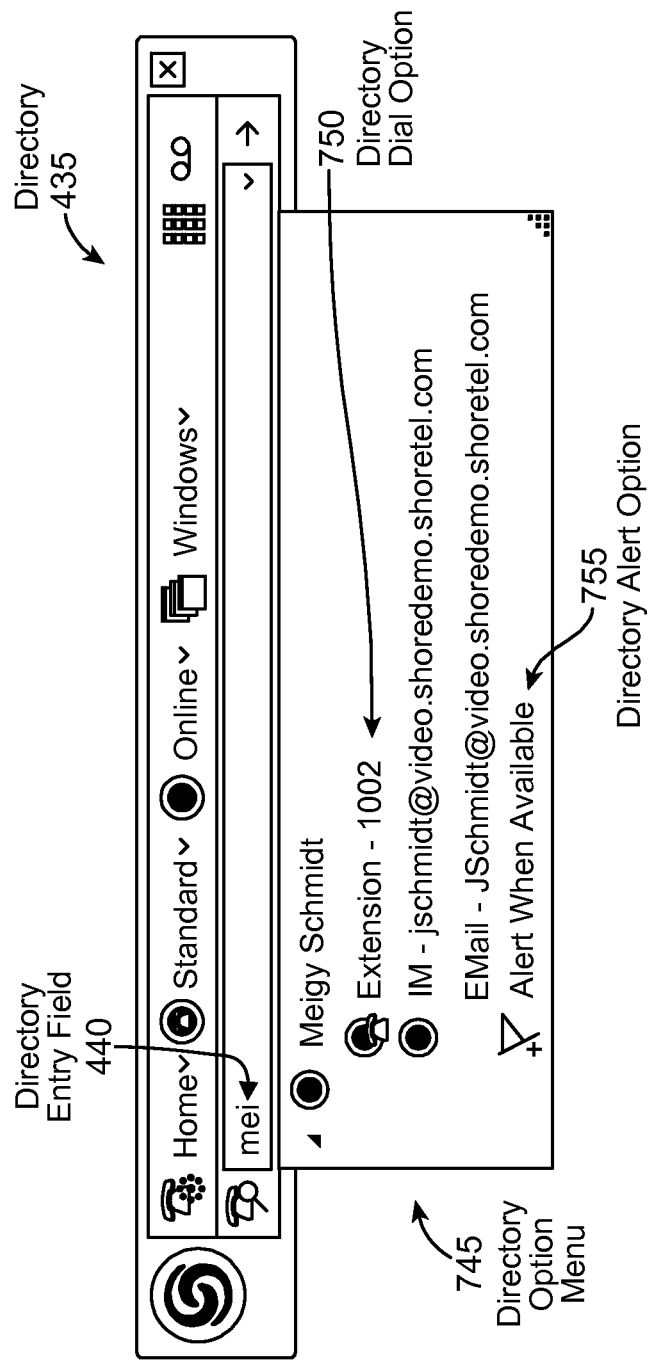
FIG. 7 is a graphical representation of one embodiment of a user interface showing a directory options menu in accordance with the present invention.

As a fourth example, the user can access 245 the directory 435 by entering text related to either a name or other contact information associated with the desired contact in the directory entry field 440, as depicted in FIG. 7. In response to the entered text, the interface module 125 presents an interactive directory options menu 745 that includes various communication options for the desired contact. In one embodiment, the user can designate the desired contact for presence change alert by selecting 250 a directory alert option 755 icon included in the directory options menu.

Again, in the embodiment depicted in FIG. 7, a single directory alert option 755 icon is presented and the presence change alert manager 110 determines one or more relevant types of availability. In one embodiment, any type of communication for which the desired contact is unavailable at the time the directory alert option 755 icon is selected 250 is treated as a relevant type of availability. The presence change alert manager 110 can also analyze user-configured default settings as part of determining one or more relevant types of availability. Again, in one embodiment, the user can configure default settings permitting the presence change alert manager to analyze the selection process to determine one or more additional relevant types of availability beyond those indicated by other default settings. In other embodiments, multiple protocol-specific alert option icons are included in the directory contact options menu 745, allowing the user to directly specify one or more relevant types of availability.

Figure 3:
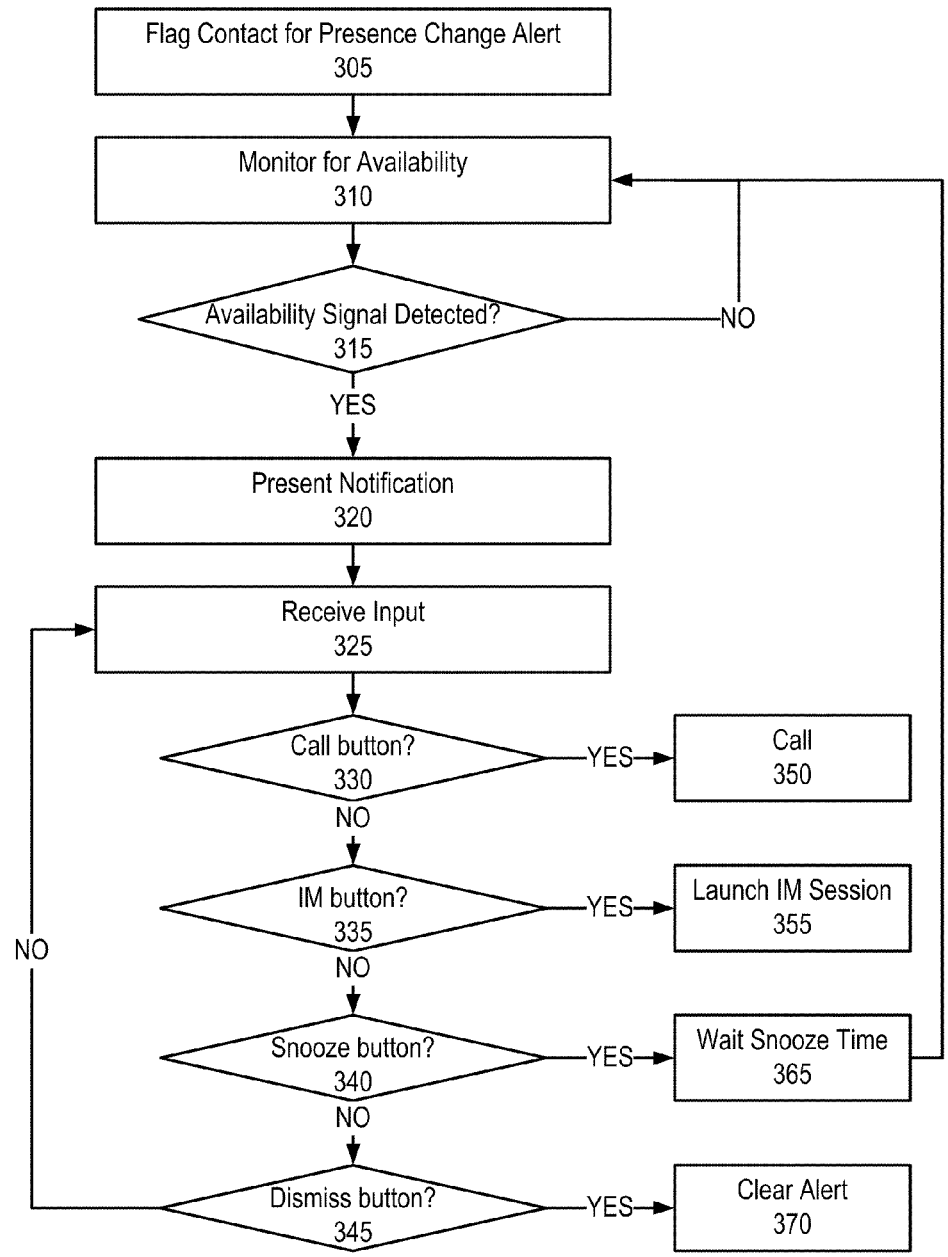
FIG. 3 is a flowchart of a method for providing presence change alert in accordance with one embodiment of the present invention.

After a user has selected a desired contact for presence change alert, the call manager 150 provides presence change alert over multiple types of communication for the desired contact. FIG. 3 is a flowchart of a method for providing presence change alert in accordance with one embodiment of the present invention. In one embodiment, as part of providing presence change alert, the call manager 150 presents interfaces such as those illustrated in FIGS. 8-9. Accordingly, for the sake of illustrative clarity, the following discussion of the method of FIG. 3 makes repeated reference to elements depicted in FIGS. 8-9.

Figure 8:
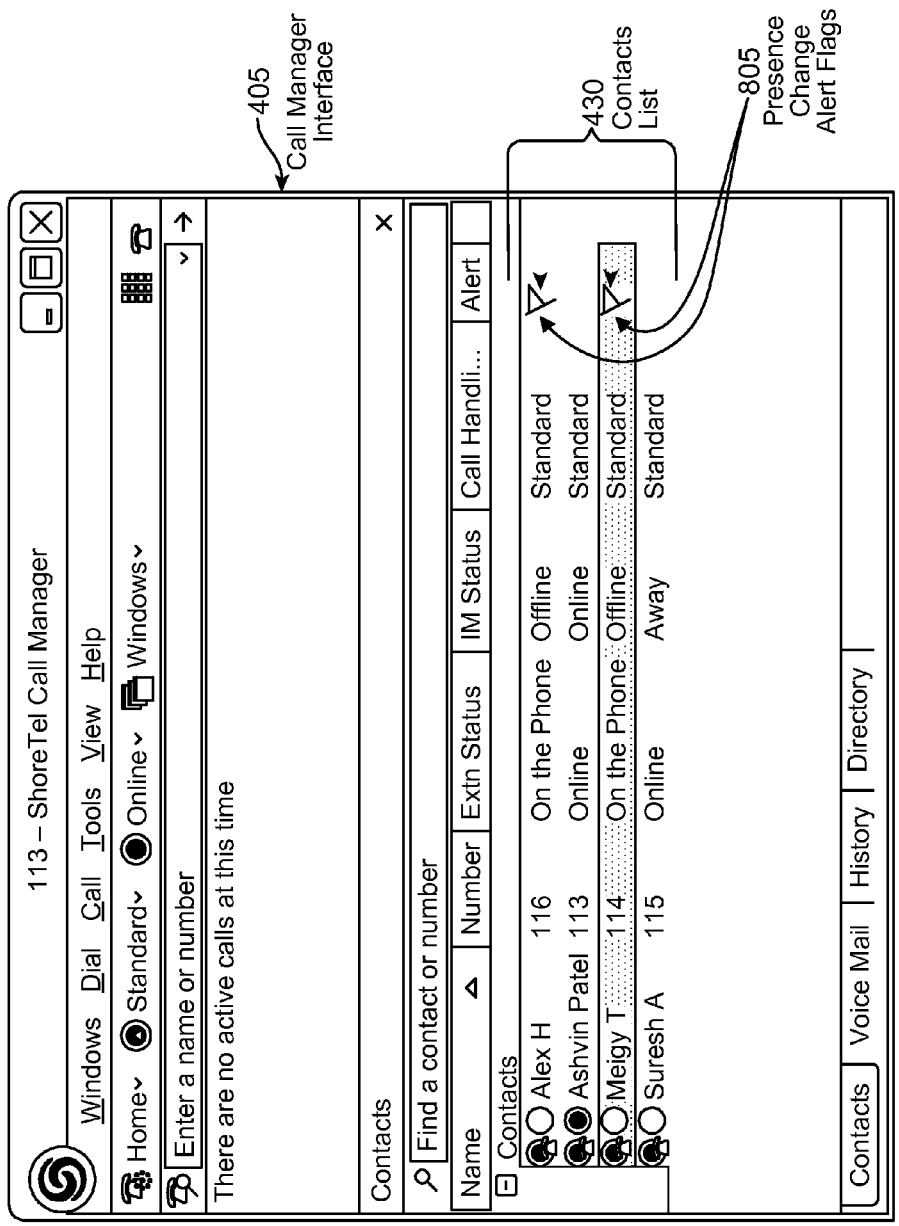
FIG. 8 is a graphical representation of one embodiment of a user interface showing a designation for presence change alert in accordance with the present invention.

First, the call manager 150 flags 305 the desired contact for presence change alert. In one embodiment, flagging 305 the contact for presence change alert includes updating the call manager interface 405. Referring now to FIG. 8, the interface module 125 can update the contacts list 430 to include presence change alert flags 805 to flag 305 any contact for which presence change alert has been selected. The call manager 150 then monitors 310 for availability of the desired contact by checking 315 the network 190 for a relevant availability signal. So long as an availability signal is not detected (315-No), the call manager 150 continues to monitor 310. As stated above, monitoring 310 for availability can include receiving an availability signal and determining if it corresponds to a relevant type of availability for the desired contact. In other embodiments, the presence change alert manager 110 periodically polls network entities (e.g., the scheduling server 170, telephony server 175 or IM server 180) to request availability information related to the desired contact.

After the availability signal is detected (315-Yes), the notification manager 115 presents 320 a notification to the user. The notification can be presented 320 on any conventional display device coupled to the client 105. As stated above, in some embodiments, the client 105 is communicatively coupled to multiple display devices. In one embodiment, the user selects a desired contact by interacting with either a first GUI presented on a first display device of a VoIP phone that includes the client 105 or a second GUI presented on a second display device of a general purpose computer coupled to the client 105. Similarly, the notification can be presented on the first display device, the second display device, or both, thereby eliminating the need for the user to monitor any single display. Other combinations of display devices are possible.

Referring now to FIG. 9, an embodiment of a notification comprising a notification window 905 is depicted. The notification window 905 is an interactive interface, such as a GUI, and includes a time indicator 910 icon. The time indicator 910 icon allows the user to easily identify when the notification was presented 320. The notification window 905 also includes a call button 915 icon, an IM button 920 icon, a snooze button 925 icon and a dismiss button 930 icon. Additionally, the notification window 905 includes a snooze time selector 935, which in one embodiment is an interactive drop-down menu allowing the user to specify a snooze time (e.g., 5, 10, 15, 25, 30, 45 or 60 minutes).

After presenting 320 the notification window 905, the call manager 150 waits to receive 325 input corresponding to a user selection. In one embodiment, the notification window 905 never closes due to a timeout event. Rather, the notification window 905 remains visible until user input is received 325. In such an embodiment, the time indicator 910 icon becomes particularly valuable to the user as the availability of the desired contact may have changed since the notification was presented 320. In other embodiments, the notification window 905 remains visible until either user input is received 325 or the desired contact again becomes unavailable, at which point the call manager returns to monitoring 310 for availability of the desired contact.

The call manager 150 checks 330 if the input is a selection of the call button 915 icon. If it is (330-Yes), the call manager 150 calls 350 the desired contact. The call manager 150 then checks 335 if the input is a selection of the IM button 920 icon. If so (335-Yes), the call manager 150 launches 355 an IM session for the desired contact. The call manager 150 next checks 340 if the input is a selection of the snooze button 925 icon. If the input is a selection of the snooze button 925 (340-Yes), the call manager 150 waits 365 for a period corresponding to the time specified by the snooze time selector 935 before again monitoring 310 for availability of the desired contact. Finally, the call manager 150 checks 345 if the input is a selection of the dismiss button 930 icon. If it is (345-Yes), the call manager 150 clears 370 the alert, effectively cancelling the requested presence change alert. In one embodiment, clearing 370 the alert includes remove the corresponding presence change alert flag 705 from the contacts list 430.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for monitoring availability of a contact, the method comprising:
   receiving a selection indicating the contact from a user;
   determining a type of communication for which the contact was unavailable when the contact was selected to communicate via the type of communication;
   determining at least one relevant type of availability associated with the contact based at least in part on a type of availability of interest to the user, the at least one relevant type of availability including a first type of availability that corresponds to the type of communication for which the contact was unavailable when the contact was selected to communicate via the type of communication;
   determining that the at least one relevant type of availability for the contact has changed based at least in part on availability information from a network; and
   responsive to determining that the at least one relevant type of availability for the contact has changed, displaying a notification alerting the user of the change of the at least one relevant type of availability for the contact, the notification including a time indicator icon that conveys a time of day when the change of the at least one relevant type of availability for the contact occurred.

2. The method of claim 1 wherein the at least one relevant type of availability comprises telephonic availability.

3. The method of claim 1 wherein the at least one relevant type of availability comprises telephonic availability and instant messaging availability.

4. The method of claim 1 wherein the at least one relevant type of availability comprises telephonic availability and scheduling availability.

5. The method of claim 1 wherein the at least one relevant type of availability comprises instant messaging availability and scheduling availability.

6. The method of claim 1 wherein the at least one relevant type of availability comprises at least two types of availability selected from the group consisting of telephonic availability, instant messaging availability, scheduling availability, video conferencing availability, and location-based availability.

7. The method of claim 1 wherein receiving a selection indicating the contact comprises:
   displaying an interface including a contact icon associated with the contact; and
   responsive to the user selecting the contact icon, displaying a contact options menu associated with the contact and including a selectable alert icon, the selectable alert icon, when selected, allows for a change in whether the notification alerting the user of the change of the at least one relevant type of availability for the contact is displayed.

8. The method of claim 1 wherein receiving a selection indicating the contact comprises:
   responsive to the user initiating a call to the contact, displaying an interface including a call cell window associated with the call, the call cell window including a selectable alert icon, the selectable alert icon, when selected, allows for a change in whether the notification alerting the user of the change of the at least one relevant type of availability for the contact is displayed.

9. The method of claim 1 wherein receiving a selection indicating the contact comprises:
   responsive to the user initiating an instant message to the contact, displaying an interface associated with the instant message and including a contact options menu, the contact options menu including a selectable alert icon, the selectable alert icon, when selected, allows for a change in whether the notification alerting the user of the change of the at least one relevant type of availability for the contact is displayed.

10. The method of claim 1 wherein receiving a selection indicating the contact comprises:
    responsive to the user entering text associated with the contact into a text entry field, displaying an interface including an options menu, the options menu including a selectable alert icon, the selectable alert icon, when selected, allows for a change in whether the notification alerting the user of the change of the at least one relevant type of availability for the contact is displayed.

11. The method of claim 1 wherein determining at least one relevant type of availability for the contact comprises:
    responsive to the contact being unavailable for a second type of availability upon receiving the selection, determining that the second type of availability is a relevant type of availability for the contact.

12. The method of claim 1 wherein determining at least one relevant type of availability for the contact comprises analyzing default settings associated with the contact.

13. The method of claim 1 wherein determining at least one relevant type of availability for the contact comprises analyzing a selection process employed by the user.

14. The method of claim 1 wherein the notification is an interface that remains visible until a user input is received.

15. The method of claim 14 further comprising, responsive to the user input comprising a selection of a call icon included in the notification, calling the contact.

16. The method of claim 14 further comprising, responsive to the user input comprising a selection of an instant message icon included in the notification, launching an instant messaging session for the contact.

17. The method of claim 14 further comprising, responsive to the user input comprising a selection of a snooze icon included in the notification:
   after waiting a specified delay, monitoring the network to obtain additional availability information; and
   responsive to determining that the additional availability information corresponds to a subsequent change of at least one relevant type of availability for the contact, displaying a subsequent notification alerting the user of the subsequent change.

18. The method of claim 17 wherein the specified delay is selected by the user from a menu included in the notification.

19. A method for monitoring availability of a plurality of contacts, the method comprising:
   receiving a plurality of selections indicating the plurality of contacts from a user;
   determining, for each contact in the plurality of contacts, a type of communication for which the respective contact was unavailable when the respective contact was selected to communicate via the type of communication;
   determining, for each contact in the plurality of contacts, at least one relevant type of availability associated with the respective contact based at least in part on a type of availability of interest to the user, the at least one relevant type of availability associated with the respective contact including a first type of availability that corresponds to the type of communication for which the respective contact was unavailable when the respective contact was selected to communicate via the type of communication;
   determining the at least one relevant type of availability for a first contact included in the plurality of contacts has changed based at least in part on a first availability information from a network; and
   responsive to determining that the at least one relevant type of availability for the first contact included in the plurality of contacts has changed, displaying a first notification alerting the user of the first change of the at least one relevant type of availability for the first contact, the notification including a time indicator icon that conveys a time of day when the change of the at least one relevant type of availability for the first contact occurred.

20. The method of claim 19, further comprising:
   responsive to determining that second availability information obtained from a network corresponds to a second change of at least one relevant type of availability for a second contact included in the plurality of contacts, displaying a second notification alerting the user of the second change.

21. The method of claim 20, wherein the second notification is displayed concurrently with the first notification.

22. The method of claim 19, further comprising:
   displaying a list of the plurality of contacts; and
   removing a contact from the plurality of contacts in response to a user input.

23. An apparatus for monitoring availability of a contact, the apparatus comprising:
   a non-transitory computer-readable medium storing computer-executable code, the computer-executable code comprising:
      an interface module for receiving a selection indicating the contact from a user;
      a presence change alert manager for determining a type of communication for which the contact was unavailable when the contact was selected to communicate via the type of communication, the presence change alert manager determining at least one relevant type of availability associated with the contact based on at least in part on a type of availability of interest to the user, the at least one relevant type of availability including a first type of availability that corresponds to the type of communication for which the contact was unavailable when the contact was selected to communicate via the type of communication, the presence change alert manager determining the at least one relevant type of availability for the contact has changed based at least in part on availability information from a network, the presence change alert manager coupled to the interface module and coupled to the network; and
      a notification manager for, responsive to the presence change alert manager determining that the at least one relevant type of availability for the contact has changed, generating and displaying a notification alerting the user of the change of the at least one relevant type of availability for the contact, the notification manager coupled to the presence change alert manager and the notification including a time indicator icon that conveys a time of day when the change of the at least one relevant type of availability for the contact occurred.

24. The apparatus of claim 23 wherein the at least one relevant type of availability comprises telephonic availability.

25. The apparatus of claim 23 further comprising:
   a first display device for displaying an interface generated by the interface module, the first display device coupled to the interface module; and
   a first input device for receiving user input, the first input device coupled to the interface module.

26. The apparatus of claim 25 wherein the interface module receives a selection indicating the contact from a user by:
   generating an interface including a contact icon associated with the contact; and
   responsive to the user selecting the contact icon, generating a contact options menu associated with the contact and including a selectable alert icon, the selectable alert icon, when selected, allows for a change in whether the notification alerting the user of the change of the at least one relevant type of availability for the contact is displayed.

27. The apparatus of claim 25 wherein the interface module receives a selection indicating the contact from a user by:
   responsive to the user initiating a call to the contact, generating an interface including a call cell window associated with the call, the call cell window including a selectable alert icon, the selectable alert icon, when selected, allows for a change in whether the notification alerting the user of the change of the at least one relevant type of availability for the contact is displayed.

28. The apparatus of claim 25 wherein the interface module receives a selection indicating the contact from a user by:

responsive to the user initiating an instant message to the contact, generating an interface associated with the instant message and including a contact options menu, the contact options menu including a selectable alert icon, the selectable alert icon, when selected, allows for a change in whether the notification alerting the user of the change of the at least one relevant type of availability for the contact is displayed.

29. The apparatus of claim 23 wherein the presence change alert manager determines at least one relevant type of availability for the contact by:

responsive to the contact being unavailable for a second type of availability upon receiving the selection, determining that the second type of availability is a relevant type of availability for the contact.

30. The apparatus of claim 23 wherein the presence change alert manager determines at least one relevant type of availability for the contact by analyzing default settings associated with the contact.

31. The apparatus of claim 23 wherein the presence change alert manager determines at least one relevant type of availability for the contact by analyzing a selection process employed by the user.

32. The apparatus of claim 25 wherein:

the first display device is further configured to display the notification generated by the notification manager and is coupled to the notification manager; and the first input device is coupled to the notification manager.

33. The apparatus of claim 25 further comprising:

a second display device for displaying the notification generated by the notification manager, the second display device coupled to the notification manager; and a second input device for receiving user input, the second input device coupled to the notification manager.

34. The apparatus of claim 23 wherein the apparatus is included in a Voice over Internet Protocol telephone having a display.

35. The method of claim 1, wherein the availability information includes scheduling information describing a schedule of the contact, and a determination that the at least one relevant type of availability has changed is based on the schedule of the contact.

36. The method of claim 1, wherein the availability information is determined based on geo-location information that describes a physical location of the contact, and a determination that the at least one relevant type of availability has changed is based on the physical location of the contact.

* * * * *